(12) United States Patent
Blair et al.

(10) Patent No.: US 8,966,028 B2
(45) Date of Patent: *Feb. 24, 2015

(54) VIRTUAL PLACEHOLDER CONFIGURATION FOR DISTRIBUTED INPUT/OUTPUT MODULES

(75) Inventors: Richard A. Blair, Plaistow, NH (US); Kenneth S. Lee, Cambridge, MA (US); Nitin Dhayagude, North Andover, MA (US); Kerry Van de Steeg, Windham, NH (US); Heinz Schaffner, Rodermark (DE); Torsten Joachim Brune, Obertshausen (DE); Sascha Michael Kreβ, Hosbach (DE)

(73) Assignee: Schneider Electric USA, Inc., Palatine, IL (US)

( * ) Notice: Subject to any disclaimer, the term of this patent is extended or adjusted under 35 U.S.C. 154(b) by 360 days.

This patent is subject to a terminal disclaimer.

(21) Appl. No.: 13/471,071

(22) Filed: May 14, 2012

(65) Prior Publication Data

US 2012/0290759 A1 Nov. 15, 2012

Related U.S. Application Data

(63) Continuation of application No. 11/755,706, filed on May 30, 2007, now abandoned.

(60) Provisional application No. 60/809,855, filed on May 30, 2006, provisional application No. 60/809,856, filed on May 30, 2006.

(51) Int. Cl.
*G06F 15/177* (2006.01)
*G05B 19/05* (2006.01)
(Continued)

(52) U.S. Cl.
CPC .............. *G05B 19/054* (2013.01); *G06F 3/067* (2013.01); *G06F 9/5077* (2013.01); *H04L 67/1097* (2013.01); *G05B 2219/1101* (2013.01);
(Continued)

(58) Field of Classification Search
CPC .... G06F 3/067; G06F 9/5077; H04L 67/1097
USPC .......................................... 709/220, 221, 222
See application file for complete search history.

(56) References Cited

U.S. PATENT DOCUMENTS 4,189,769 A * 2/1980 Cook et al. .......................... 710/1
4,313,160 A * 1/1982 Kaufman et al. ............... 710/23
(Continued)

FOREIGN PATENT DOCUMENTS

EP 0434288 11/1995
WO 2007149688 12/2007

OTHER PUBLICATIONS

Advantys STB System Planning and Installation Guide 890USE17100, Version 1.0, Telemecanique, Sep. 2003, all pages.
(Continued)

*Primary Examiner* — Hieu Hoang
(74) *Attorney, Agent, or Firm* — Banner & Witcoff, Ltd.

(57) ABSTRACT

A modular distributed I/O system for an industrial automation network that allows one or more modules of an island to be omitted without requiring reconfiguration of the system by maintaining a consistent I/O image representation of the distributed I/O network for various physical distributed I/O configurations, and managing reconfiguration changes using Virtual Placeholder objects.

14 Claims, 6 Drawing Sheets

(51) Int. Cl.
*G06F 3/06* (2006.01)
*G06F 9/50* (2006.01)
*H04L 29/08* (2006.01)

(52) U.S. Cl.
CPC . *G05B2219/1126* (2013.01); *G05B 2219/1141* (2013.01); *G05B 2219/1143* (2013.01); *G05B 2219/15002* (2013.01)
USPC .......................... 709/221; 709/220; 709/222

(56) References Cited

U.S. PATENT DOCUMENTS

| | | | | |
|---|---|---|---|---|
| 5,097,410 | A * | 3/1992 | Hester et al. | 710/31 |
| 5,255,379 | A | 10/1993 | Melo | |
| 5,561,784 | A * | 10/1996 | Chen et al. | 711/157 |
| 5,761,448 | A | 6/1998 | Adamson | |
| 5,923,664 | A | 7/1999 | Aldebert | |
| 5,978,593 | A | 11/1999 | Sexton | |
| 5,979,593 | A | 11/1999 | Rice | |
| 6,032,265 | A | 2/2000 | Oguro | |
| 6,072,798 | A * | 6/2000 | Beasley | 370/395.72 |
| 6,226,762 | B1 | 5/2001 | Foote | |
| 6,643,561 | B1 | 11/2003 | Torvinen | |
| 6,744,450 | B1 | 6/2004 | Zimniewicz | |
| 6,874,046 | B1 | 3/2005 | LeCrone | |
| 6,982,953 | B1 | 1/2006 | Swales | |
| 7,058,693 | B1 * | 6/2006 | Baker, Jr. | 709/217 |
| 7,293,129 | B2 * | 11/2007 | Johnsen et al. | 710/313 |
| 7,353,305 | B2 * | 4/2008 | Pangal et al. | 710/74 |
| 7,370,239 | B2 | 5/2008 | Apel | |
| 7,447,197 | B2 | 11/2008 | Terrell | |
| 7,689,803 | B2 * | 3/2010 | Karr et al. | 711/203 |
| 8,028,062 | B1 | 9/2011 | Wigmore et al. | 709/224 |
| 8,171,121 | B2 * | 5/2012 | Ayyar et al. | 709/221 |
| 8,677,356 | B2 * | 3/2014 | Jacobs et al. | 718/1 |
| 8,756,521 | B1 * | 6/2014 | Farchmin et al. | 715/771 |
| 2002/0184410 | A1 | 12/2002 | Apel | |
| 2003/0139821 | A1 * | 7/2003 | Papadopoulos et al. | 700/9 |
| 2003/0185237 | A1 | 10/2003 | Baker, Jr. | |
| 2003/0212868 | A1 * | 11/2003 | Alfieri et al. | 711/154 |
| 2003/0216971 | A1 * | 11/2003 | Sick et al. | 705/26 |
| 2004/0133718 | A1 * | 7/2004 | Kodama et al. | 710/74 |
| 2004/0143640 | A1 * | 7/2004 | Rangan et al. | 709/212 |
| 2004/0143642 | A1 * | 7/2004 | Beckmann et al. | 709/213 |
| 2004/0210677 | A1 * | 10/2004 | Ravindran et al. | 710/1 |
| 2004/0230703 | A1 | 11/2004 | Sukigara | |
| 2005/0080982 | A1 | 4/2005 | Vasilevsky | |
| 2005/0120160 | A1 | 6/2005 | Plouffe | |
| 2005/0228950 | A1 * | 10/2005 | Karr | 711/114 |
| 2006/0168381 | A1 | 7/2006 | Armstrong | |
| 2006/0242332 | A1 | 10/2006 | Johnsen | |
| 2006/0253619 | A1 * | 11/2006 | Torudbakken et al. | 710/31 |
| 2006/0268854 | A1 | 11/2006 | Lee | |
| 2007/0088880 | A1 * | 4/2007 | Kodama et al. | 710/74 |
| 2007/0112982 | A1 | 5/2007 | Sichner | |
| 2007/0168476 | A1 * | 7/2007 | Davies et al. | 709/220 |
| 2008/0080544 | A1 * | 4/2008 | Mani et al. | 370/437 |
| 2008/0189715 | A1 * | 8/2008 | Armstrong et al. | 718/104 |
| 2008/0263083 | A1 * | 10/2008 | Coronado et al. | 707/102 |
| 2012/0124572 | A1 * | 5/2012 | Cunningham et al. | 718/1 |
| 2012/0297379 | A1 * | 11/2012 | Anderson et al. | 718/1 |
| 2013/0067161 | A1 * | 3/2013 | Chandra et al. | 711/114 |

OTHER PUBLICATIONS

Advantys STB Modbus Plus Network Interface Applications Guide 89USE17800, Version 1.0, Telemecanique, Sep. 2003, all pages.
Stevens, TCP/IP Illustrated, vol. 1, Chapter 23 TCP Keepalive Timer, Dec. 31, 1993, http://proquest.safaribooksonline.com/0201633469, printed Jun. 21, 2008, 4 pages.
Troll, Automatically Choosing an IP Address in an Ad-Hoc IPv4 Network, Mar. 2, 2000, IETF, http://tools.ietf.org/id/draft-ietf-dhc-ipv4-autoconfig-05.txt, printed Aug. 24, 2009, 8 pages.
Lakshmanan, Reverse Address Resolution Protocol (RARP)—Q&A, Oct. 20, 1999, Lakshmanan, http://www.geocities.com/siliconvalley/vista/8672/network/rarp.html?200924, printed Aug. 24, 2009, 5 pages.
Distributed I/O. Advantys STB. The Open Device Integration I/O System, Aug. 2004, pp. 1-8.
What are the new features introduced with version 2.0 of the Advantys Configuration Software?, Sep. 22, 2005, p. 1.
International Preliminary Report on Patentability for related case PCT/US2007/070009, issued Dec. 3, 2008, pp. 1-9.

* cited by examiner

VIRTUAL PLACEHOLDER CONFIGURATION FOR DISTRIBUTED INPUT/OUTPUT MODULES

CROSS-REFERENCE TO RELATED APPLICATIONS

This application is a continuation of U.S. patent application Ser. No. 11/755,706, filed May 30, 2007, which application claims the benefit of U.S. Provisional Application Nos. 60/809,855 and 60/809,856, both filed May 30, 2006. This application is also related to U.S. Patent Application Publication No. 2006/0268854, published Nov. 30, 2006. All of these prior applications are hereby incorporated by reference in their entirety.

FEDERALLY SPONSORED RESEARCH OR DEVELOPMENT

None.

TECHNICAL FIELD

The present invention generally relates to configuring modular distributed I/O systems in industrial automation networks. More specifically, the present invention relates to a distributed I/O system that allows the user to maintain a consistent I/O image representation on a distributed I/O network for various physical distributed I/O configurations having one or more I/O modules physically removed from the system.

BACKGROUND OF THE INVENTION

A programmable logic controller (PLC) is used to monitor input signals from a variety of input points (i.e., input sensors) that report events and conditions occurring within a controlled process. For example, a PLC can monitor such input conditions as motor speed, temperature, pressure, volumetric flow and the like. The PLC has a control program stored within its memory to instruct the PLC on what actions to take upon encountering particular input signals or conditions. In response to these input signals provided by the input sensors, the PLC derives and generates output signals that are transmitted to control the process via PLC output points to various output devices such as actuators and relays. For example, an output signal can be provided by the PLC to speed up or slow down a conveyer, rotate the arm of a robot, open or close a relay, raise or lower temperature, as well as many other possible control functions.

The input and output points referred to above are typically associated with input modules and output modules, respectively. Input and output modules are collectively referred to as I/O modules herein. Those skilled in the art alternatively refer to such I/O modules as I/O cards or I/O boards. I/O modules are typically adapted to be plugged into respective slots located on a backplane board or other attachment system provided by the PLC. The slots are coupled together by a main bus that couples any I/O module plugged into the slots to a central processing unit (CPU). The CPU itself can be located on a card that is adapted to be plugged into a dedicated slot on the backplane board of the PLC.

In many control systems, PLCs are arranged in a master/slave network that includes a master PLC and a plurality of remote slave units that can include other PLCs or devices. In this type of network, the master PLC controls its own I/O connection points and also the respective I/O connection points for the remote slave unit(s). The control commands from the master PLC are derived from data obtained from the remote slave units, which is obtained from the I/O module(s) connected to each remote slave unit.

To meet the needs of machine manufacturers and users, automation architectures have been decentralized or distributed while delivering performance comparable to centralized systems. For instance, the ADVANTYS STB distributed. PO system is an open, modular input/output system that makes it possible to design islands of automation managed by a master controller via a bus or communication network. The ADVANTYS STB distributed I/O system is a product of Schneider Automation Inc., One High Street, North Andover, Mass.

These automation islands, typically installed close to the machine, help reduce the time and cable cost for sensors and actuators, while increasing system availability. The island components are electronic modules mounted on one or more DIN rails (i.e., standardized rails). These clusters of modules, known as segments, carry a bus from the beginning to the end of each island. The island bus provides power distribution, signal sensing, and power management to compatible modules.

An island can include one or more segments comprising a network interface module (NIM), a power distribution module (PDM), and additional modules for various architectures such as I/O modules, bus extension modules, island bus termination, and island bus extensions.

The island is typically configured using a user interface. The NIM is responsible for assigning addresses to the I/O modules and for maintaining a process image of the I/O modules. Both the NIM and the I/O modules participate in I/O modules automatically obtaining their addresses based on their relative physical locations—using an auto-addressing protocol. The NIM is responsible for maintaining a process image of the I/O modules, which is based on the addresses of the I/O modules. Such an addressing scheme could not handle the situation where a user wanted to physically remove I/O modules that correspond to unwanted options without changing the program to add/delete the options.

Each island is comprised of several I/O modules, divided into several groups. Each group of I/O modules represents one option available in a customer's machine. When all options are included in a particular machine, then all groups of I/O modules must be physically present; this forms the "base" configuration. Different machines may contain different options, hence different groups of I/O modules.

When a machine is built, a technician uses a human-machine interface (HMI) connected to the PLC that controls the automation system and other parts of the machine to select which options are physically present in the machine. To ease PLC programming, the process image of the island must remain identical, regardless of the machine options that are chosen by the customer (and subsequently the I/O modules that are physically present).

In prior versions of automation systems, the Customer must build and maintain different island configuration files for machines with different options; this can be quite burdensome in cases where there are many combinations of machine options available. It is desired that for each base configuration, only one island configuration be necessary.

The present invention provides an I/O configuration solution to overcome these and other problems.

SUMMARY OF THE INVENTION

The present invention is directed to an improved distributed I/O system that allows the user to create one fully defined process image that contains all the I/O modules needed for all the desired configurations of the physical distributed I/O island using Virtual Placeholder objects. This allows one or more I/O modules to be removed without requiring reconfiguration or reprogramming of the system. By maintaining the identical process image of the island, a user does not need to reconfigure or change the PLC program, even if the user removes certain modules from the base set.

One embodiment of the present invention is directed to an automation system comprising: a network interface module; a plurality of I/O modules comprising an I/O island; and a translation table configured using Virtual Placeholders such that an I/O module in a physical slot X having node ID X is presented outside the I/O island as if that I/O module were located in slot Y.

Another embodiment of the present invention is directed to a system for configuring a process image in an automation network having one or more optionally uninstalled I/O modules, the system comprising: an island having a network interface module, the island further including a plurality of connections for I/O modules; and configuration software run by the network interface module that provides a consistent process image for each one of the plurality I/O modules whether or not physically present.

Still another embodiment of the present invention is directed to a method of configuring a process image of an island to indicate optionally uninstalled I/O modules, comprising the steps of: providing an island having a network interface module and a plurality of ports, each of the plurality of ports capable of connection to an I/O module; connecting I/O modules to select ports of the plurality of ports; and creating a process image of the island that indicates whether an I/O module is physically present and not present using Virtual Placeholders.

The present invention is particularly useful for a user who builds many systems and/or machines with I/O configurations that differ (from a remote I/O point of view) only in the number and types of I/O modules physically present. In the past, each of the configurations of I/O modules would result in a change to the I/O image representation on the remote I/O network, necessitating a change to the master controller program to accommodate the configuration change. The present invention facilitates keeping the I/O image representation the same for the various configurations.

The configuration software of the present invention is adapted to describe the master (maximum) remote I/O configuration. The software is then used to identify those I/O modules that will not be present in the actual physical configuration to create a reduced configuration. The physical remote I/O configuration is built without the "not-present" module(s). The reduced or de-populated configuration is applied to the physical configuration, which maintains the same I/O image representation on the remote I/O network as the master configuration.

BRIEF DESCRIPTION OF THE DRAWINGS

Other features and advantages of the present invention will be apparent from the following specification taken in conjunction with the following drawings.

DETAILED DESCRIPTION

Figure 1:
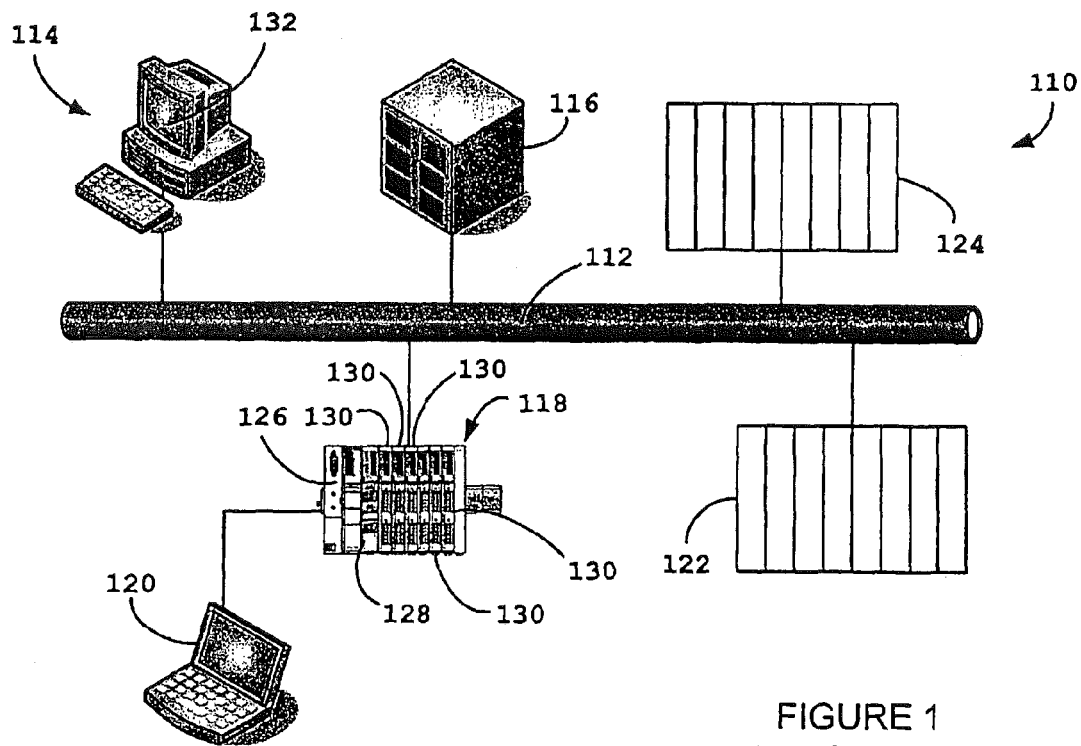
FIG. 1 (PRIOR ART) is a simplified block diagram of a typical automation control system or network having a distributed I/O system or island.

While this invention is susceptible of embodiments in many different forms, there is shown in the drawings and will be described in detail herein a preferred embodiment of the present invention with the understanding that the present disclosure is to be considered as an exemplification of the principles of the invention and is not intended to limit the broad aspect of the present invention to the embodiment illustrated.

FIG. 1 depicts a typical automation control network or system 110 having a distributed I/O system (i.e., island). The automation system 110 includes a local area network 112, a host computer 114, at least one master or main programmable logic controller (PLC) 116, a distributed I/O system or island 118, a human-machine interface (HMI) terminal 120, other network nodes 122, and other slave PLCs 124. The distributed I/O system 118 includes a network interface module (NIM) 126, a power distribution module (PDM) 128, and I/O modules 130. As will be described below in detail, configuration software provides display screens on the host computer monitor 132.

The local area network (LAN) 112 can be Ethernet based (e.g., IEEE 802.3) or can use other protocols such as, but not limited to, CANopen, Profibus, FIPIO or the like. Furthermore, the network 112 can be wired or wireless (e.g., IEEE 802.11 or the like).

The master or main PLC 116, like the host computer, is operatively connected to the local area network 112. As will be appreciated by those having skill in the art, both the host computer 114 and the main PLC 116 can be conventional products that are currently available in the marketplace.

The host computer 114 is operatively connected to the master or main programmable logic controller 116 via the LAN 112. In operation, the host computer 114 provides the master or main programmable logic controller 116 with data or programming that represents a desired operation or function to be performed by the control network 110. The data can be based, at least in part, on modules (i.e., options), while building the process image as if all modules are present.

Figure 2:
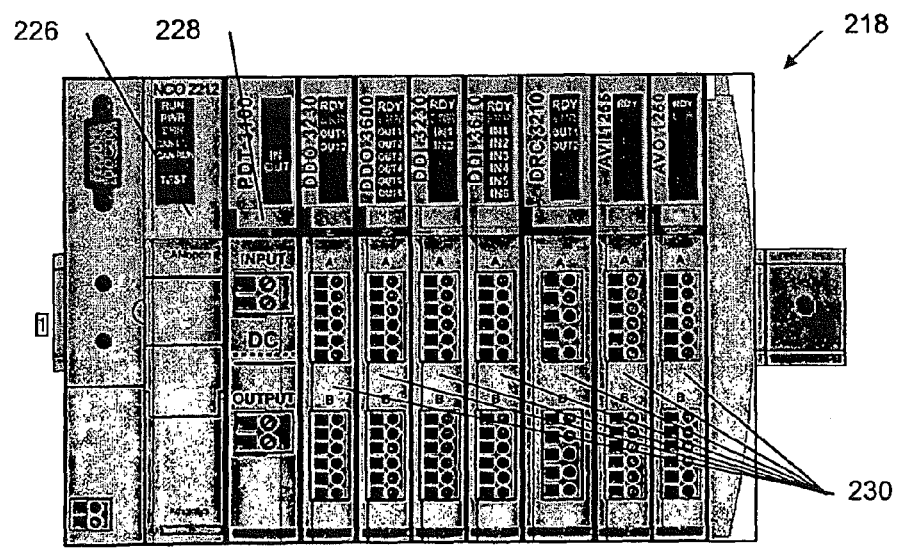
FIG. 2 is an elevation view of a distributed I/O system or island in accordance with the present invention.

Turning now to FIG. 2, an elevation view of a distributed I/O system or island 218 in accordance with the present invention is depicted. The distributed I/O system or island can be used within the control network depicted in FIG. 1. As indicated previously, the control network 110 includes, but is not limited to, a local area network 112 having a host computer 114 and at least one master or main programmable logic controller (PLC) 116 connected thereto. Additionally, the distributed I/O system 218 is connected to the local area control network 112. The island 218 has a network interface module (NIM) 226, a power distribution module (PDM) 228, and a plurality of I/O modules 230.

As will be described in detail below, the island 218 of FIG. 2 is configured using a user interface (i.e., the host computer 114) having a software interface installed thereon. The host computer. 114 supplies the island 218 with configuration data or programming. In particular, a configuration program is loaded onto the host computer 114 where, by executing the program, a user can configure the island 218.

The I/O devices or modules 230 that can be attached to the island 218 include, for example, input sensors and/or output actuators. The input sensors can be for a variety of variables including, but not limited to, temperature, flow, pressure, speed, and the like.

Figure 3:
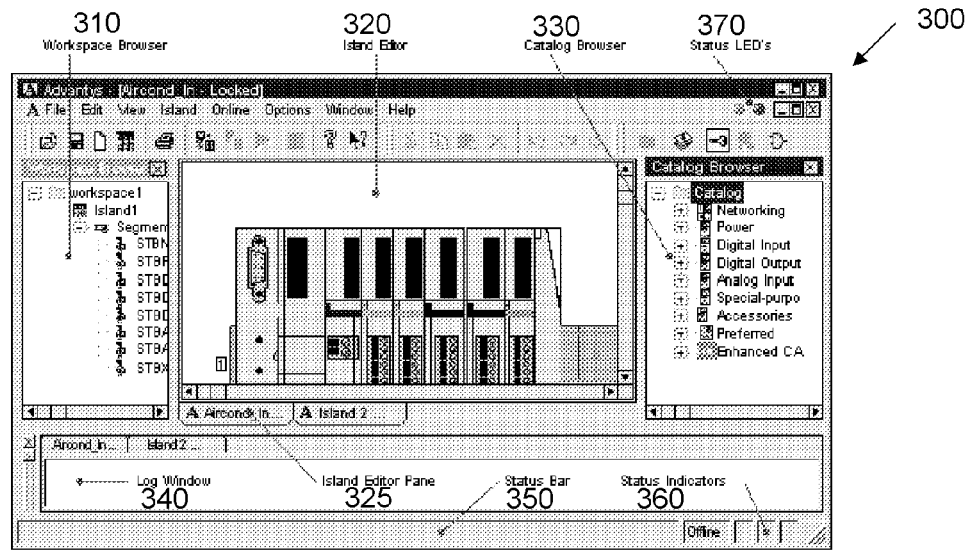
FIG. 3 is a main display screen of the configuration software for configuring the distributed I/O system or island shown in FIG. 2.

FIG. 3 is a main display screen 300 of the configuration software for configuring the distributed I/O system or island shown in FIG. 2. As shown in FIG. 3, the configuration software provides a main display screen on the host computer monitor 132. The main screen 300 includes several windows and components.

A Workspace Browser 310 displays the contents of the currently open workspace in a hierarchical or tree-structured fashion. The browser displays all the islands currently residing in the selected workspace.

An Island Editor 320 provides a graphical representation of the logical islands being configured with the software. Each opened logical island has its own Island Editor window pane 325.

A Catalog Browser 330 is a list of all the modules available to the user when assembling an Island. The catalog is displayed as a tree structure in which various modules are grouped according to type.

A Log Window 340 displays the results of any operation performed by the configuration software. In Online mode, it displays additionally health information of the physical island including upstream fieldbus error messages.

A Status Bar 350 and Status Indicators 360 at the bottom of the screen provides status messages, offline/online status, physical island status, etc. Two Status LEDs 370 at the top-right side of the screen are active when the software is in online mode. The green LED represents the RUN LED on a NIM, while the red LED represents the ERROR LED. Several blink codes are also used to indicate various island states of operation.

Figure 4:
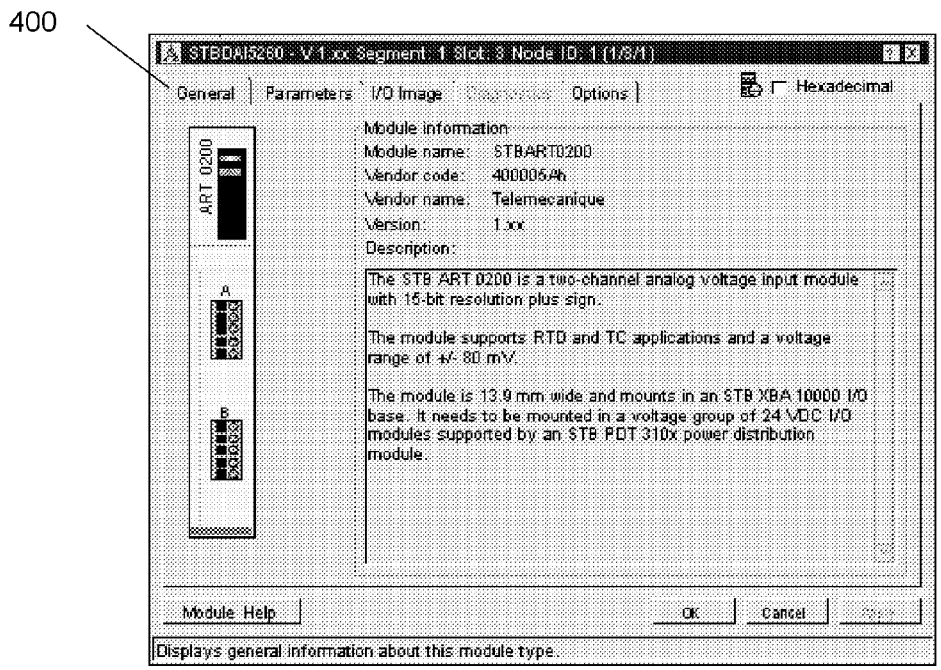
FIG. 4 is a general display screen for configuration of an I/O module within the distributed I/O system or island of FIG. 2.

FIG. 4 is a general display screen for configuring an individual I/O module. The Module Editor screen provides information about a selected module, allows the user to modify some operating parameters, and permits the user to view live I/O data when the software is in online mode. The Module Editor is invoked by selecting the appropriate module from the Island Editor or from the Workspace Browser.

The General tab 400 of the Module Editor displays descriptive information about the selected module. All information on this tab is read-only. The name of the module and its exact location on the island bus are displayed in the title bar at the top of the screen. The general information provided includes the module name, vendor code, vendor name, version, and a brief functional description of the module.

Figure 5:
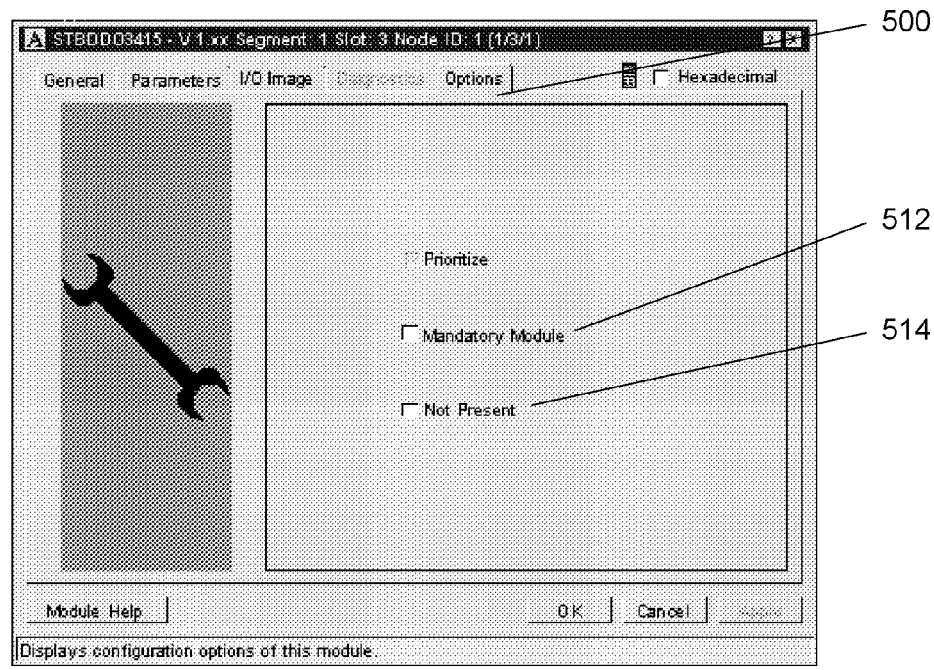
FIG. 5 is an options display screen for configuration of the I/O module, showing the module "Not Present" option.

FIG. 5 shows the Options tab 500 for configuration of the I/O module. This window provides the user the ability to configure the module as a "Mandatory Module" 512 or as "Not Present" 514. If the user designates the selected I/O module as Mandatory by selecting checkbox 512, and the Mandatory Module fails or is removed from the island, the entire island bus switches to pre-operational mode and the island bus stops.

If the user designates the selected I/O module as "Not Present" by selecting checkbox 514, the module is marked using the Virtual Placeholder feature of the present invention. A Virtual Placeholder allows the user to remove certain physical island I/O modules from a base configuration, while keeping the identical process image. This allows one to define an island with various options removed without changing the PLC program which controls the island. In the case of having removed some I/O modules, the remaining ones may have to be physically plugged next to each other, as spare slots are sometimes not allowed.

According to a preferred embodiment of the present invention, the island 218 maintains the same process image after a module is configured to be "Not-Present" and physically removed from a base set of modules for the island. Accordingly, by maintaining the process image, a user is able to operate the same configuration and program without being required to change the configuration or program in the PLC 116. Hence, the user chooses the modules that the user does not wish to physically install, but will still take up space in the process image to maintain the same process image as the original full system.

If no module is selected to be "Not Present," then the existing auto-addressing protocol is used. However, if a user selects one or more I/O modules not to be present, then the use of an amended auto-addressing protocol may be required. An auto-addressing protocol is provided in a network interface module and an I/O module for skipping node ID's of uninstalled modules not to be used in the process. Each time that the island is powered up or reset, the NIM automatically assigns a unique island bus address to each module on the island that will engage in data exchange. Refer to U.S. Patent Application Publication No. US 2006/0268854 A1 for a detailed description of the preferred auto-addressing protocol.

Figure 6:
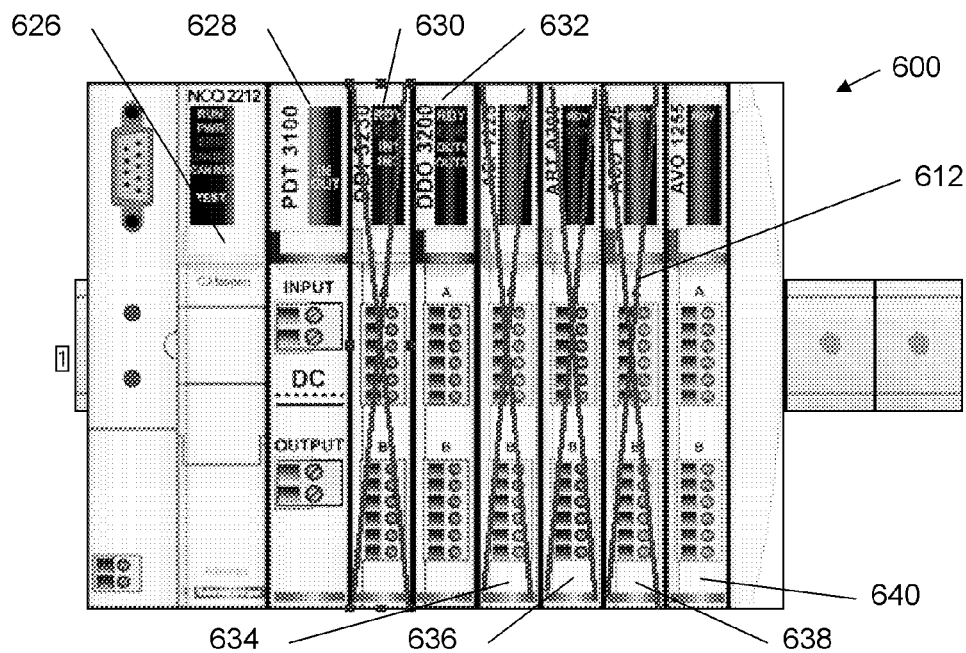
FIG. 6 is a partial display of the main screen similar that of FIG. 3, showing those modules configured to be not physically present being indicated as so.

FIG. 6 is a partial display 600 of the main display screen similar that of FIG. 3, showing those modules configured to be Virtual Placeholders (and not physically present) being designated with indicia 612 showing their absence. In the preferred embodiment, the Module Editor marks all the Virtual Placeholder modules with crossed red lines over the view of the particular module to indicate that the module is not physically installed.

Thus, instead of the full configuration, a user may build a physical system that only includes the following modules shown in FIG. 6: the Network Interface Module 626, such as the ADVANTYS STB NCO 2212; the Power Distribution Module 628, such as the ADVANTYS STB PDT 3100; a Digital Output Module 632, such as the ADVANTYS STB DDO 3200; and an Analog Output Module 640, such as the ADVANTYS AVO 1255. Accordingly, only two ADVANTYS I/O modules are physically installed. Modules 630, 634, 636, and 638 are shown in FIG. 6 as Virtual Placeholders.

It is important to distinguish between a "physical island" and a "logical island". A "physical island" is an assembly of distributed I/O, power distribution, and island bus communication/extension modules that function together as one node on a fieldbus. An island contains up to 32 I/O modules plus a NIM, one or more power distribution modules, and optionally some modules that let you extend the bus to multiple segments (or rails) of other I/O and to standard CANopen devices. Using the present invention, the configuration software lets the user model a physical island so that it can be tested against design rules and customized to meet application requirements. This software model is called the "logical island". As the user develops a logical island, the software will provide warnings about any mistakes made in the model, and it will usually prevent the user from creating an invalid configuration. For example, it prevents you from placing a DC module in a location where it would receive AC field power (and vice versa). The logical island is a file in the software program with a ".isl" extension. It contains a description of the physical island, including all the modules on the island and all the operating parameters associated with each module that may be defined in software. Hence, the logical view of the island which reflects the I/O map for the user program remains unchanged, while the physical view which reflects the physically present STB modules may change. In case of having removed some modules, the remaining ones may have to be physically plugged in next to each other, as some system buses may not allow spare slots.

Figure 7:
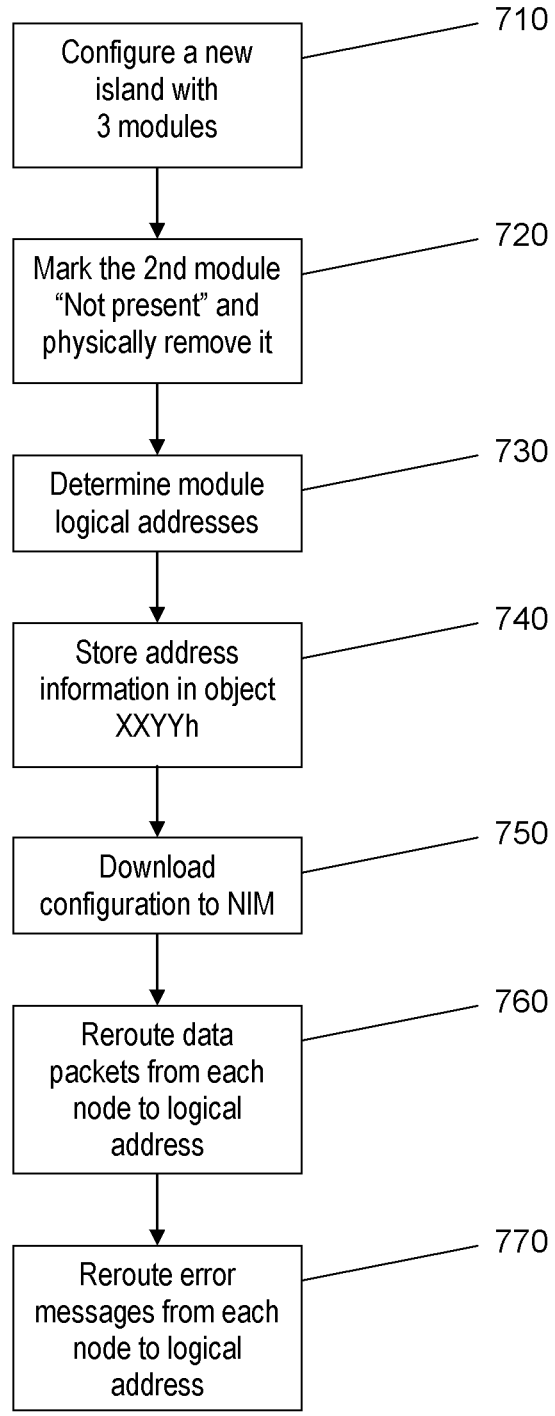
FIG. 7 is a flowchart showing the steps a user would take to configure an island using the Virtual Placeholder feature of the invention.

FIG. 7 is a flowchart 700 showing the general steps that occur when a user configures an island using the Virtual Placeholder feature of the invention.

Starting with Step 710, the user would use the configuration software to build a new island. In this simplified example, only three modules are used for the sake of clarity. Initially, the first module has an address 1, the second module has an address 2, and the third module has an address 3.

In Step 720, the user chooses which modules that he does not wish to physically install, but still take up space in the process image (to maintain the same process image as the original full system). As shown above in FIG. 5, the selection process is done using the Virtual Placeholder "Not Present" checkbox 514 in the Options tab 500 of the I/O module configuration software. The modules selected to not be physically present are displayed with indicia 612 indicating their absence, as shown by the crossed red lines in FIG. 6. The user would then physically remove the Not Present module(s). In this simplified example, only the 2nd module would be a Virtual Placeholder and removed from the physical setup.

In Step 730, the logical addresses of the modules are now automatically determined by the configuration software. The first physical module retains its logical address 1, but the second physical module, which used to be third module, is now reassigned to logical address 2.

This logical address information is internally stored by the configuration software in Step 740 in object XXYYh as follows: logical node address of physical node 1=1; logical node address of physical node 2=3; logical node address of physical node 3=null. In the preferred embodiment, a new object index is used as an address translation table to show the correlation between the logical node address of and the physical node address when the Virtual Placeholder feature is enabled. The new object XXYYh and any extended objects become part of the configuration data, which are saved in flash memory.

In Step 750, the translation table generated by the configuration software is downloaded to the network interface module as part of the configuration data. Depending upon the configuration tool used, the translation table must be downloaded first, and then the other object dictionary entries should to be downloaded.

Step 760 illustrates that the data packet from each node is "rerouted" to the location corresponding to the logical address for that module. In the preferred embodiment, this is done by changing the "COB-ID" (CAN Object Identifier) of the data packet of those modules whose logical address no longer matches the physical address. This "Data Mapping" Step 760 will be described below in FIGS. 8A and 8B.

A similar procedure is used for the error registers in Step 770. Again, the logical address of each physical module (using object XXYYh) is used to signify which node is in error. This "Error Status" Step 770 will be described below in FIGS. 8C and 8D.

After the NIM has powered up and the new configuration has been downloaded, the island state is displayed in the configuration software and can be sent to the fieldbus master, wherein only those I/O modules that are selected to be physically present are taken into account. In this example, if both the first and third I/O modules are present and function normally, the island state will not present an error message indicating that unexpected or missing modules are in the island configuration. Under prior auto-addressing protocols, the node ID's would have had to been node ID 1 and node ID 2. Selecting the Virtual Placeholder option causes the module to be taken out of the auto-addressing, identification check, configuration, and diagnostics procedures of the NIM. The module configuration data is still part of the island configuration. The I/O image of the island remains unchanged, i.e., it still contains the I/O data of the module.

FIGS. 8A-8D are routing diagrams showing the various data mapping and status mapping configurations used in the three-module example of FIG. 7.

Figure 8A:
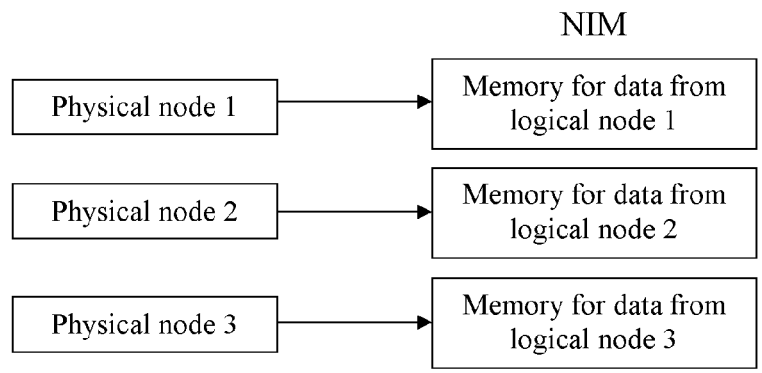
FIGS. 8A-8D are routing diagrams showing the various data mapping and status mapping configurations used in a simple example of the invention.

In FIG. 8A, the normal data memory mapping is shown when the Virtual Placeholder is not used, i.e., all I/O modules are physically present. As shown in the Figure, there would simply be a direct one-to-one correspondence between the physical node IDs and the logical node IDs stored in the NIM.

Figure 8B:
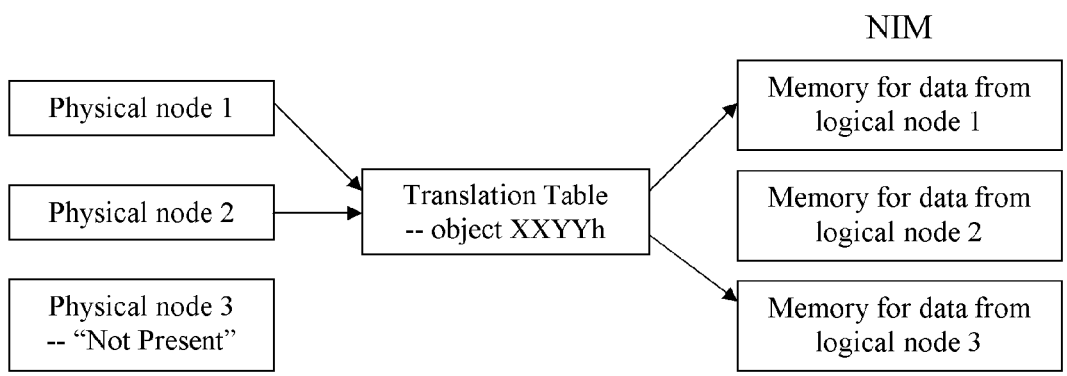

FIG. 8B shows the Virtual Placeholder data memory mapping when the second module is removed and marked "Not Present". Since the second module was removed (and the third module shifted left into its place at physical node 2), then physical node 1 is mapped to logical node address 1, physical node 2 is mapped to logical node address 3, and physical node 3 has a "null" logical node address. This data mapping is accomplished in the translation table stored in object XXYYh.

Figure 8C:
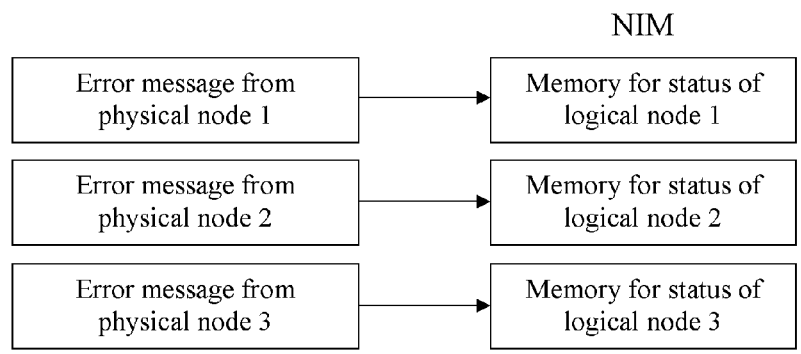

A correspondence similar to FIG. 8A is shown in FIG. 8C for normal status memory mapping when the Virtual Placeholder is not used, i.e., when all I/O modules are physically present. As before, there would simply be a direct one-to-one relationship for the error messages sent from the physical node IDs to the status memory locations for the logical node IDs stored in the NIM.

Figure 8D:
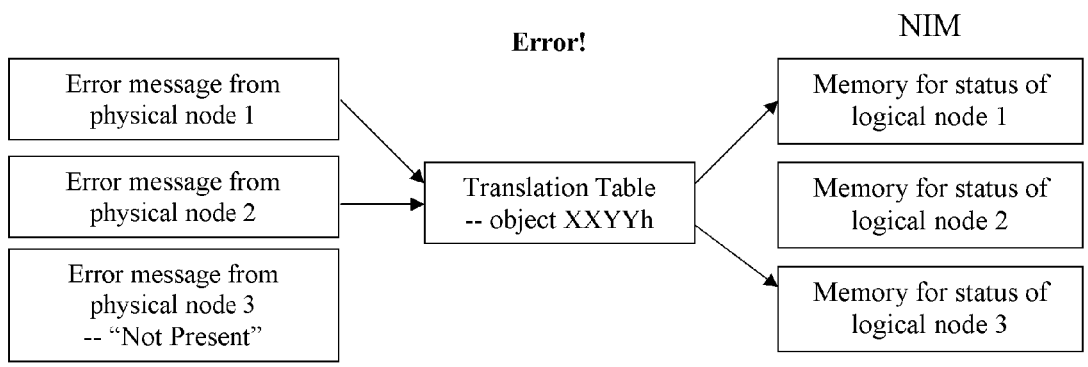

However, FIG. 8D illustrates that when the second module is removed and marked "Not Present", the translation table stored in object XXYYh routes the error messages from physical node 1 to logical node address 1, and from physical node 2 to logical node address 3. Since the second module was removed (and the third module shifted left into its place at physical node 2), then the third module has a "null" logical node address.

Hence, it can now be understood that the island configuration software includes a translation table that informs the system which physically present node corresponds to which logical node, and translates the physical view to the logical view every time it gets a physical reference. This translation table is generated by the configuration software and is downloaded and stored in the NIM as part of the configuration data. Other configuration data to be downloaded to the NIM remains unchanged Those skilled in the art will appreciate that the NIM firmware needs to be modified in a way that it will be able to handle the physical and logical view as described above. The NIM interfaces (command interface, diagnostic interface, process image) will always present the logical view. Therefore, the upstream fieldbus will also represent the logical view without (or with minor) changes in the existing fieldbus handler.

The Virtual Placeholder feature may be limited to certain I/O modules capable of being part of the auto-addressing. The other (non-auto-addressed) modules may not be allowed to be "Not Present".

In summary, the Virtual Placeholder feature lets the create a standard island configuration and de-populated variations of that configuration that share the same fieldbus process image, thereby maintaining a consistent PLC or fieldbus master program for various island configurations. In other words, using the Virtual Placeholder feature of the present invention, an I/O module in a physical slot X (node ID X) is presented to the outside world as if it were located in slot Y, similar to using an alias.

This Virtual Placeholder capability allows a user to create a master (maximum) configuration of I/O modules that can be de-populated to form subsets (both in number of I/O modules and features), yet retain the same I/O image representation on the remote I/O network. One such application is that of a machine builder who builds machines with several options that can be specified by the end-user. By properly portioning his system into various options, he can create machines with particular features that exist if particular options (of I/O modules) are present, or without those particular features if the options are not physically present, without changing the master controller program with regards to addressing the I/O image. The de-populated islands are physically built using only those modules that are not marked as being not present, thus saving cost and space.

While the invention is amenable to various modifications and alternative forms, specifics thereof have been shown by way of example in the drawings and have been described in detail. It should be understood, however, that the intention is not to limit the invention to the particular embodiments described. To the contrary, the intention is to cover all modifications, equivalents, and alternatives falling within the spirit and scope of the invention as defined by the appended claims.

The invention claimed is:

1. A system for configuring a process image in an automation network, the system comprising:
   a physical island having a network interface module, the physical island further including a plurality of input/output (I/O) modules,
   wherein configuration software run by the network interface module maintains a consistent process image for various distributed I/O configurations having one or more I/O modules of the plurality of I/O modules physically removed from the system using virtual placeholders, and
   wherein said configuration software generates a translation table that provides a correlation between node addresses of the physical island and node addresses of a logical island model of said physical island, wherein an I/O module of the plurality of I/O modules in a physical slot X having node ID X is presented outside the physical island as if that I/O module were located in slot Y.

2. A method of configuring a process image of a physical island, the method comprising:
   providing the physical island having a network interface module and a plurality of ports, each of the plurality of ports capable of connection to one of a plurality of input/output (I/O) modules;
   connecting at least one of the plurality of I/O modules to at least one of the plurality of ports; and,
   creating the process image of the physical island that indicates whether each of the plurality of I/O modules is physically present and not present using virtual placeholders,
   wherein the creating the process image further includes generating a translation table that provides a correlation between node addresses of the physical island and node addresses of a logical island model of said physical island, wherein an I/O module of the plurality of I/O modules in a physical slot X having node ID X appears in the logical island model as if that I/O module were located in slot Y and wherein an I/O configuration of the physical island maintains a consistent process image for various physical distributed I/O configurations having one or more I/O modules of the plurality of I/O modules physically removed.

3. The system of claim 1, wherein said configuration software provides for an indication of one or more I/O modules of the plurality of I/O modules selected by a user to be physically not present in the physical island to be displayed with particular indicia indicating an absence, such that the one or more I/O modules indicated as being physically not present are distinguishable from other I/O modules indicated as being physically present.

4. The system of claim 1, wherein said configuration software provides a user with functionality to create the logical island model of said plurality of I/O modules comprising the physical island, such that the logical island model can be tested against particular design rules and application requirements.

5. The system of claim 4, wherein said translation table is downloaded and stored in said network interface module as part of configuration data.

6. The method of claim 2, wherein the creating the process image includes:
   (a) creating the logical island model using the virtual placeholders, and
   (b) determining the logical node addresses for each of the plurality of I/O modules.

7. The method of claim 2, further comprising: providing for an indication of one or more I/O modules of the plurality of I/O modules selected by a user to be physically not present in the physical island to be displayed with particular indicia indicating an absence, such that the one or more I/O modules indicated as being physically not present are distinguishable from other I/O modules indicated as being physically present.

8. The method of claim 2, wherein the creating the process image includes determining the logical node addresses for each of the plurality of I/O modules.

9. A non-transitory computer-readable storage medium having computer-executable program instructions stored thereon that when executed by a processor, cause the processor to perform a method comprising:
   providing a physical island having a network interface module and a plurality of ports, each of the plurality of ports capable of connection to one of a plurality of input/output (I/O) modules;
   connecting at least one of the plurality of I/O modules to at least one of the plurality of ports; and,
   creating a process image of the physical island that indicates whether each of the plurality of I/O modules is physically present and not present using virtual placeholders, wherein the creating the process image further includes generating a translation table that provides a correlation between node addresses of the physical island and node addresses of a logical island model of said physical island, wherein an I/O module of the plurality of I/O modules in a physical slot X having node ID X appears in the logical island model as if that I/O module were located in slot Y and wherein an I/O configuration of the physical island maintains a consistent process image for various physical distributed I/O configurations having one or more I/O modules of the plurality of I/O modules physically removed.

10. The non-transitory computer-readable storage medium of claim 9, wherein the translation table is downloaded to the network interface module.

11. The non-transitory computer-readable storage medium of claim 9, wherein the processor further performs: routing error messages to a predetermined logical address based on the virtual placeholders.

12. The non-transitory computer-readable storage medium of claim 9, wherein the creating the process image includes determining the logical node addresses for each of the plurality of I/O modules.

13. The non-transitory computer-readable storage medium of claim 9, wherein the processor further performs: providing for an indication of one or more I/O modules of the plurality of I/O modules selected by a user to be physically not present in the physical island to be displayed with particular indicia indicating an absence, such that the one or more I/O modules indicated as being physically not present are distinguishable from other I/O modules indicated as being physically present.

14. The non-transitory computer-readable storage medium of claim 9, wherein the creating the process image includes:
(a) creating the logical island model using the virtual placeholders, and
(b) determining the logical node addresses for each of the plurality of I/O modules.

* * * * *